May 20, 1924.
W. R. EVANS
LAWN EDGER AND SOD CUTTER
Filed June 10, 1921
1,495,007
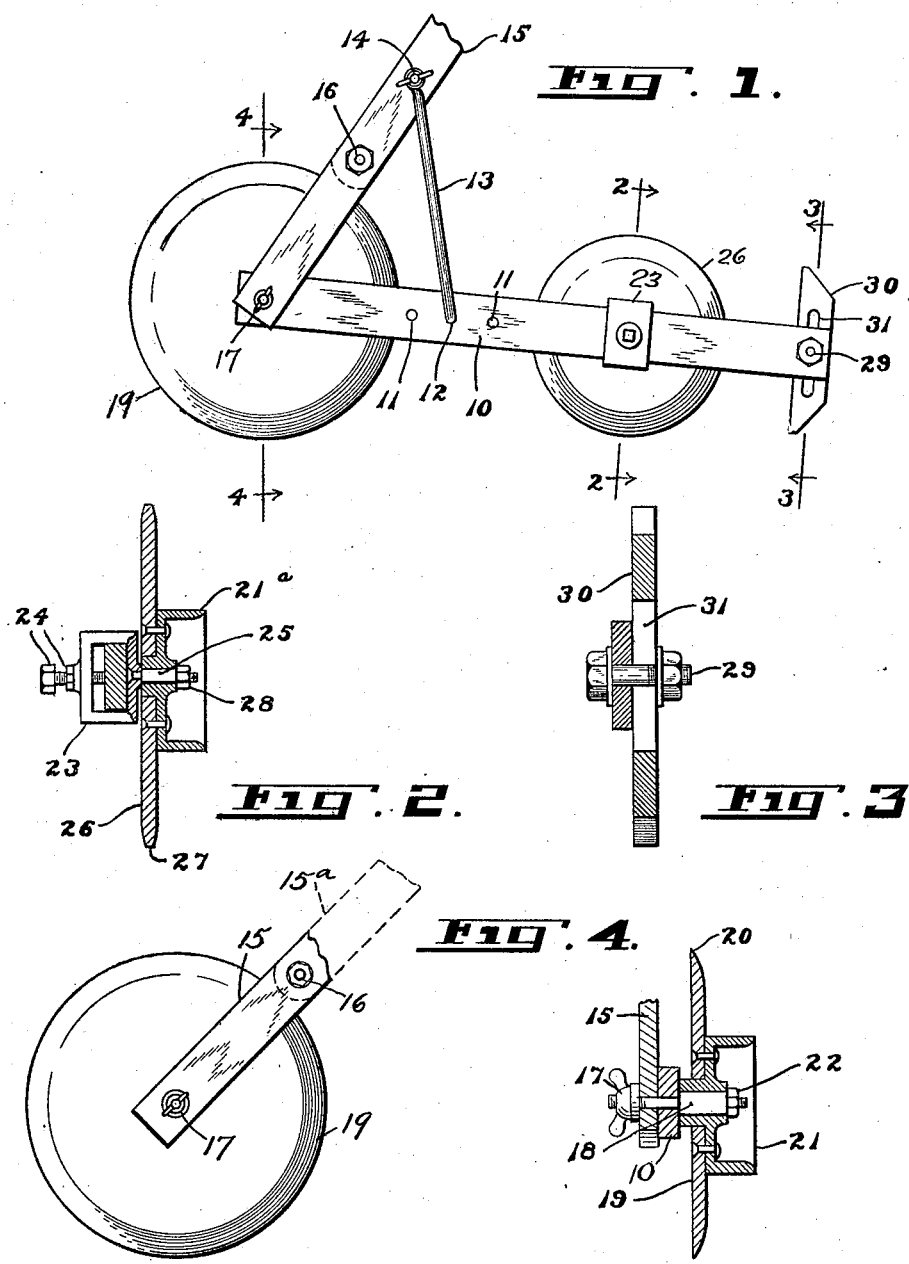
William R. Evans.
INVENTOR
BY Victor J. Evans
ATTORNEY Patented May 20, 1924.

1,495,007

UNITED STATES PATENT OFFICE.

WILLIAM R. EVANS, OF RIVERTON, NEW JERSEY.

LAWN EDGER AND SOD CUTTER.

Application filed June 10, 1921. Serial No. 476,530.

*To all whom it may concern:*

Be it known that I, WILLIAM R. EVANS, a citizen of the United States, residing at Riverton, in the county of Burlington and State of New Jersey, have invented new and useful Improvements in Lawn Edgers and Sod Cutters, of which the following is a specification.

This invention relates to lawn edgers, and it has more particular reference to devices of the nature which are adapted to cut a groove or channel in the sod or earth adjoining the edges of side walks, curb stones and similar places, the primary object being to provide a device which is easily adapted for reverse action, that is to say, which may be employed in a right-hand or left-hand direction.

Another object of the invention is to provide a combined lawn edger and sod cutter with which is associated a trencher or groove former.

A further object of the invention is to provide a simple, durable and efficient device of the type referred to wherein the trimming knife or blade is made adjustable relative to the trencher, and the invention also aims to generally improve devices of the nature referred to whereby they are rendered more efficient in use.

With the foregoing and other objects in view as will be more clearly apparent as this description proceeds my invention consists essentially in the novel features of construction, combination and arrangement of parts hereinafter fully described and more specifically defined by the appended claim.

In the further disclosure of the invention reference is to be had to the accompanying sheet of explanatory drawings which are illustrative of one practical embodiment of my invention, like characters of reference designating the same or corresponding parts in all the views.

Figure 1 is a side view of my improved combined lawn edger and sod cutter, the major portion of the handle being broken away.

Figure 2 is an enlarged section on the line 2—2 in Figure 1.

Figure 3 is a similar enlarged transverse section on the line 3—3 in Figure 1.

Figure 4 is a transverse section taken substantially on the line 4—4 in Figure 1; and, Figure 5 is a detailed view illustrative of the application of a portion of my invention as a sod cutter.

Referring more particularly to the views the numeral 10 designates what may be termed the body member of my improved device and it conveniently consists of a rectangular section bar which is adapted in use to have the operating parts secured thereon as later on explained. This bar or body member 10 is provided with one or more holes 11 which serve to receive the turned in end 12 of a brace bar 13 which is provided with an eye at its upper end through which a bolt 14 is passed and whereby said brace is coupled to the handle supporting member 15. A fragmentary portion of the handle proper 15ª being indicated in dotted lines in Figure 5, and it is to be noted that the handle is rigidly clamped in operative alignment on said handle supporting member 15 by a bolt and lock-nut 16. Clamped to the lower end of the handle supporting member 15 by means of a lock-nut 17 is a stub axle 18 which constitutes a pivot on which is appropriately mounted the rotary cutting knife 19. This rotary cutting knife 19 is preferably formed in cross section as shown, that is to say, it is provided with a cutting edge 20 and it is suitably riveted or otherwise attached in any of the well-known ways to the ground wheel 21. A lock-nut connection 22 serves to provide a simple and effective means whereby the rotary cutting knife is removably mounted on the stub axle 18. In the rear of the aforesaid brace 13 and adapted for longitudinal movement on the aforesaid body member 10 is a box-like slide 23 arranged for clamping engagement thereto at the desired position by means of a stud and lock-nut 24. Formed on or rigidly secured to the box-like slide 23 is a stub axle 25 on which is rotatably mounted the trimming wheel or groove former 26, said trimming wheel or groove former being of the cross section shown, that is to say, it is provided with a blunt or ditching perimeter 27 and it is to be noted that a lock-nut 28 maintains the trimming wheel in operable position on the stub axle 25.

Arranged at the rear of the aforesaid body member 10 and adapted for clamping engagement thereto by a bolt 29 is a scraping groove former or gouge members 30 which is of the pattern shown, that is to say, it is made double-ended and it is provided with a longitudinal slot 31 whereby the depth of the groove may be accurately adjusted. Furthermore it is to be noted that by making this groove former 30 of the pattern shown it is rendered reversable.

In Figure 5 I have shown the application of a portion of my invention for use as a sod cutter and it preferably consists in removing the rotary cutting knife 19 from the body member 10 and using it detached from the rest of the device, or coupled to the handle supporting member 15 and handle 15$^a$ as shown, when it may be manipulated in any desired direction.

From the foregoing description and an examination of the drawings the use and operation of my combined lawn edger and sod cutter will be clearly apparent, as it will be easily seen that the device can be moved along the edge of a side walk, curb stone or other similar ground level by means of the ground wheels 21, 21$^a$, the latter being the corresponding ground wheel on the trimming wheel 26 to the ground wheel 21 on the rotary cutter 20. Still further it will be noted that as the device is moved along on the wheels 21, 21$^a$ that the rotary cutter 20 will cut the grass adjoining the side walk or other place over which the device is traveled, whilst the trimming wheel 26 will effect the necessary finishing operation. Still further when it is desired that a groove or channel is to be formed the groove former 30 will have been previously adjusted vertically to the required position for creating the requisite depth of said groove. Still further it will be seen and will be readily understood by those acquainted with the art of landscape gardening that by my invention I have provided a very durable, efficient, and easily adjustable lawn edging device which can be promptly disconnected and arranged to serve as a sod cutter, and that by the particular arrangement and combination of parts the device is rendered promptly adjustable for use in either a right-hand or left-hand direction.

Still further I wish it to be clearly understood that whilst I have described and shown the preferred embodiment of my invention it is not to be construed as conclusive as it will be obvious to those acquainted with the art that the same is susceptible of changes in the pattern and the arrangement of the several parts, and it is hereby intended to include all such reasonable modifications thereof as fairly fall within the scope of the appended claim.

Having described my invention, what I claim as new and desire to secure by Letters Patent is:

In a device of the kind described the combination of a body supporting bar, a combined rotatable cutting wheel and ground wheel in unitary construction removably mounted on one side of said supporting bar and at one end thereof, a longitudinally slotted vertically adjustable grooving device mounted on said supporting bar at the other end thereof, a box member slidably mounted on the aforesaid supporting bar intermediate its ends, and a combined rotatable trimming wheel and ground wheel in unitary construction removably mounted on said box member, said cutting and ground wheels and grooving device all being placed on one side of the aforesaid supporting bar.

In testimony whereof I affix my signature.

WILLIAM R. EVANS.